United States Patent [19]
Mayhew

[11] Patent Number: 6,085,793
[45] Date of Patent: Jul. 11, 2000

[54] SAFETY BLINDING DEVICE

[76] Inventor: Billy E. Mayhew, HC-1 Box 33-2, Cleveland, Tex. 77327

[21] Appl. No.: 09/271,474

[22] Filed: Mar. 17, 1999

[51] Int. Cl.[7] ..................................................... F16L 55/10
[52] U.S. Cl. ........................... 138/94.3; 138/94; 138/94.5
[58] Field of Search .................................. 138/94.3, 94.5, 138/94

[56] References Cited

U.S. PATENT DOCUMENTS

| | | |
|---|---|---|
| 1,502,444 | 7/1924 | Stillwaggon . |
| 2,566,343 | 9/1951 | Livesay . |
| 2,645,244 | 7/1953 | Klickman . |
| 4,014,367 | 3/1977 | Milo . |
| 4,351,446 | 9/1982 | Madden . |
| 4,712,585 | 12/1987 | Evans ...................................... 138/94.3 |
| 4,848,458 | 7/1989 | Holdsworth et al. . |
| 5,160,119 | 11/1992 | Lemire et al. ........................... 138/94.3 |
| 5,184,608 | 2/1993 | Hale, III . |
| 5,303,742 | 4/1994 | Junier ...................................... 138/94.3 |
| 5,494,079 | 2/1996 | Tiedemann . |
| 5,582,211 | 12/1996 | Monson . |

*Primary Examiner*—James Hook
*Attorney, Agent, or Firm*—Keeling Law Firm

[57] ABSTRACT

This invention is a safety blinding device that includes a body and bolt clamps for blinding pipes. The body includes a plate and extensions that extend radially from the plate. Preferably, there are three extensions that define three angles between each other, with two of those angles measuring approximately 132 degrees and the third angle measuring approximately 96 degrees. The angle measurements enable the device to be used with any standard pipe flange having a multiple of four bolt holes by ensuring that the extensions will fall between the bolt holes. The plate is preferably sized to completely cover the raised face of the pipe flange, thereby completely covering the pipe flow passage. One bolt clamp is included for each extension. Each bolt clamp is releasably mateable to its corresponding extension, preferably by way of a threaded bolt and hole mechanism. Each bolt clamp also includes a sliding clamp mechanism, which extends and retracts so that it clamps to the inside surface of the pipe flange. With each bolt clamp clamped to the pipe flange inside surface and with the plate covering the pipe flow passage, the safety blinding device is secured to the pipe. In the preferred embodiment, the device also locks the bolt clamps together to prevent the inadvertent removal of the blinding device from the pipe.

9 Claims, 3 Drawing Sheets

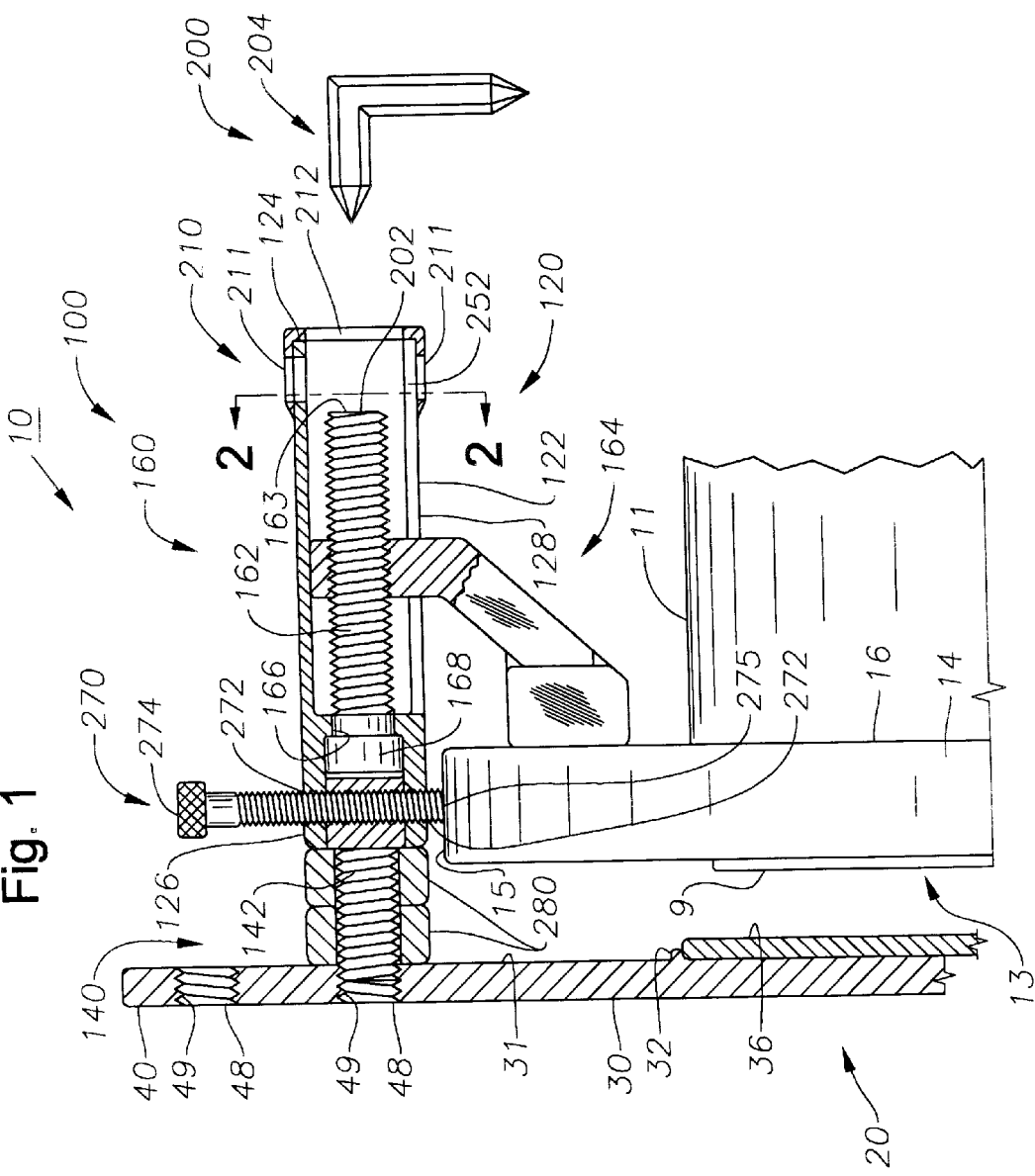

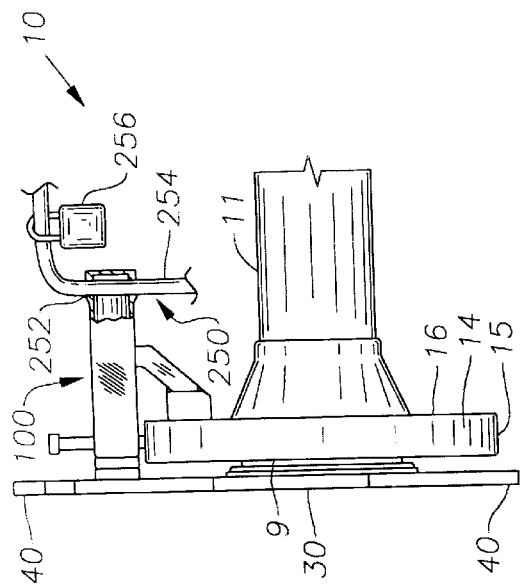
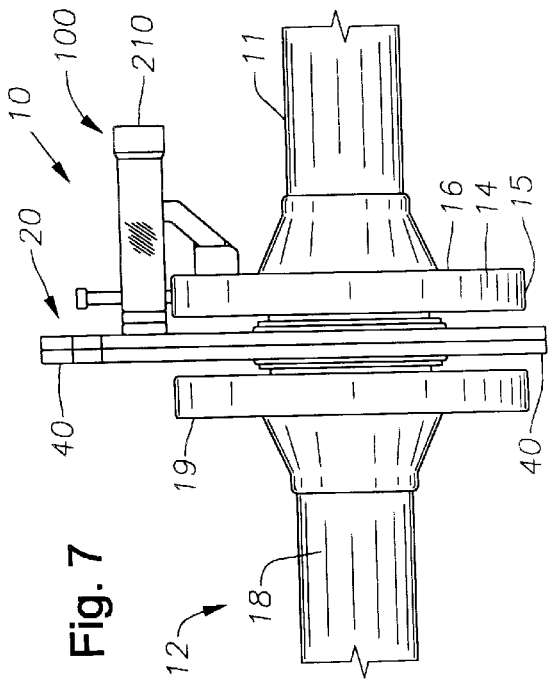
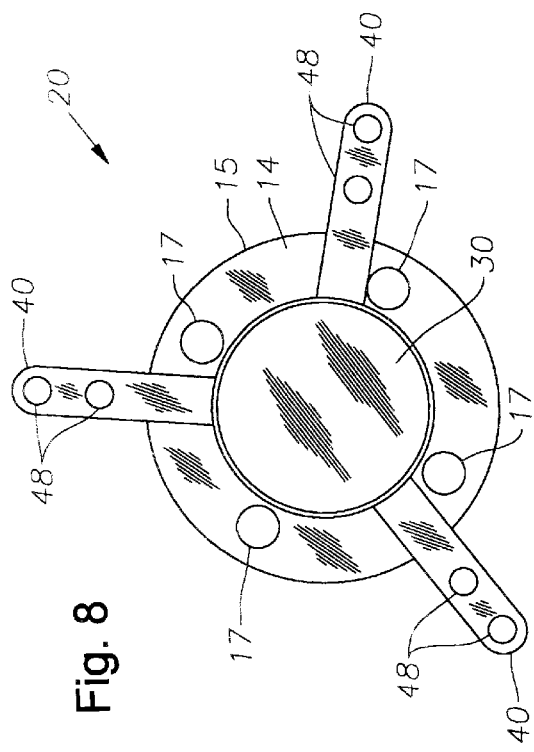
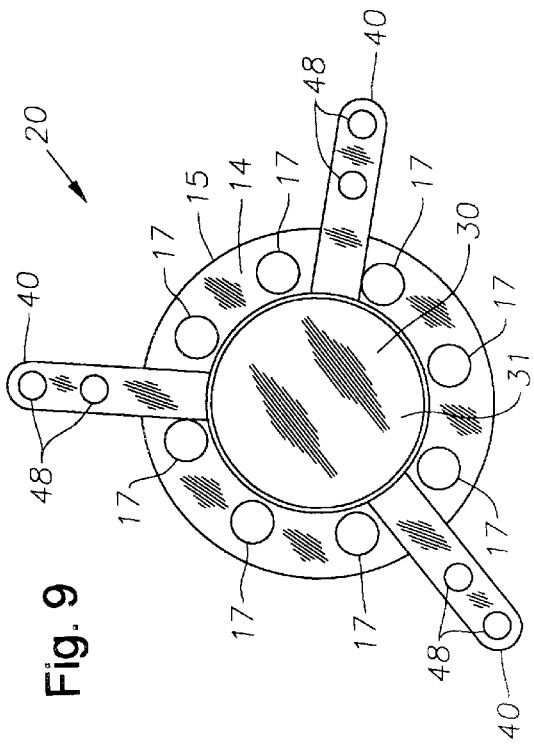

SAFETY BLINDING DEVICE

BACKGROUND OF THE INVENTION

1. Field of Invention

This invention relates generally to safety devices for industrial plants. Specifically, this invention is a safety blinding device used to cover the openings of pipes or industrial vessels while such pipes and vessels, or adjacent pipes and vessels, are taken off-line for maintenance and cleaning.

Blinding devices ensure that pipes and vessels being cleaned or maintained are completely cut off from the remainder of the industrial process. By cutting them off from the process, the hazardous fumes or substances normally present in the process flow are not injected into the vessel or pipe being maintained. Blinding is particularly critical if the workers performing the cleaning or maintenance (of the vessel or pipe) would be exposed to the hazardous substances were it not for the blinding devices.

2. Related Art

Devices that are able to temporarily cut-off pipelines, vessels, and other industrial containers and elements are known to the prior art. Illustrative of such devices are U.S. Pat. No. 1,502,444 issued to Stillwaggon on Jul. 22, 1924; U.S. Pat. No. 2,566,343 issued to Livesay on Sep. 4, 1951; U.S. Pat. No. 2,645,244 issued to Klickman on Jul. 14, 1953; U.S. Pat. No. 4,014,367 issued to Milo on Mar. 29, 1977; U.S. Pat. No. 4,351,446 issued to Madden on Sep. 28, 1982; U.S. Pat. No. 4,848,458 issued to Holdsworth et al. on Jul. 18, 1989; U.S. Pat. No. 5,184,608 issued to Hale, III on Feb. 9, 1993; U.S. Pat. No. 5,494,079 issued to Tiedemann on Feb. 27, 1996; and U.S. Pat. No. 5,582,211 issued to Monson on Dec. 10, 1996.

The Klickman '244 patent, the Livesay '343 patent, and the Monson '211 patent each disclose a typical prior art blinding device. The typical prior art blinding device generally comprises a circular body and at least one extension leg. The circular body is large enough to fully cover the opening of the relevant pipe, vessel, container, or industrial element. The extension leg extends radially from the circular body. In operation, if a first industrial element (such as a vessel or pipe) needs to be taken off-line for maintenance purposes, the first industrial element must be cut-off from its adjacent industrial element (such as an adjacent pipe or flange) and the remainder of the process. The blinding device is positioned between the flange of the first industrial element and the flange of the adjacent industrial element so that the circular body covers the openings of both the first and adjacent industrial elements. The extension leg must be sized and constructed so that it clearly sticks out from within the flanges once functionally positioned therebetween. The blinding device is held in place by screwing threaded bolts through the flange bolt holes of both the first and adjacent industrial elements. Thus, the blinding device is caught between the flanges of the first and adjacent industrial elements. A colorful tag is then attached to the extension leg in order to warn workers that the blinding device should not be removed. Notably, the blinding device itself is normally not attached to the flanges but merely compressed therebetween.

Problems typically arise when both the first and adjacent industrial elements are concurrently taken off-line for maintenance. Unfortunately, the blinding device is sometimes left off of both industrial elements when the industrial elements are brought back on-line. In this case, if the first industrial element is not ready to be on-line at the same time as the adjacent industrial element, process flow or other fumes may flow from the adjacent industrial element into the first industrial element endangering the lives of any people working in or around the first industrial element.

It would thus be beneficial to the prior art to provide a blinding device that attaches to the flange of the relevant industrial element and is not just compressed between flanges. It would also be beneficial to the prior art to provide a blinding device that is attachable to the flanges of either or both of the relevant industrial elements. In order to ensure that it is not mistakenly removed at any point, the prior art would also benefit from a blinding device that can be locked into place. It would be a further benefit to the prior art to provide a blinding device that fits various sizes and pressure ratings of pipes and other industrial elements. In addition, it would be beneficial to the prior art to provide a blinding device that can enable both sealing blinding, in which a tight seal is achieved between the blinding device and the relevant flange, and spacer blinding, in which a spacer with holes is positioned between the blinding device and the relevant flange.

SUMMARY OF THE INVENTION

It is therefore an objective of this invention to provide a safety blinding device that, among others,:

attaches to the flange of the relevant industrial element;

is attachable to the flanges of either or both of the relevant industrial elements;

can be locked into place;

fits various sizes and pressure ratings of pipes and other industrial elements; and can enable both sealing blinding and spacer blinding.

Other objectives of this invention will become apparent from time to time throughout the reading of this specification, claims, and drawings.

To achieve the stated objectives, my invention is a safety blinding device for blinding pipes that generally includes a body and a plurality of bolt clamps. The body comprises a plate that is preferably circular in shape and a plurality of extensions that preferably extend radially from the plate. Preferably, a plurality of extensions comprises three extensions that define three angles between each other, with two of those angles measuring approximately 132 degrees and the third angle measuring approximately 96 degrees. The angle measurements enable the device to be used with any standard pipe flange having a multiple of four bolt holes by ensuring that the extensions will fall between the bolt holes. The plate is preferably sized to completely cover the raised face of the pipe flange thereby also completely covering the pipe flow passage. Safety blinding device also comprises one bolt clamp for each extension. Each bolt clamp is releasably mateable to its corresponding extension, preferably by way of a threaded bolt and hole mechanism. Each bolt clamp also includes a sliding clamp mechanism, which extends and retracts so that it clamps to the inside surface of the pipe flange. With each bolt clamp clamped to the pipe flange inside surface and with the plate covering the pipe flow passage, safety blinding device is secured to the pipe. In the preferred embodiment, device also includes a means for locking the bolt clamps together so as to not allow the inadvertent removal of the device from the pipe.

BRIEF DESCRIPTION OF THE DRAWINGS

FIG. 1 is a view of the blinding device mounted on a pipe, with the blinding device in cross-section except for the screw and centering bolt.

FIG. 2 is a cross-sectional view of the bolt clamp (not including the lower portion of the sliding clamp) taken along line 2—2 of FIG. 1.

FIG. 6 is a side elevational view of the blinding device sealingly blinding a pipe, with the bolt clamp in partial cross-section to illustrate the means for locking.

FIG. 7 is a side elevational view of the blinding device sealingly blinding two pipes, with the bolt clamp in partial cross-section.

FIG. 8 is a front elevational view of the blinding device mounted on a pipe having a pipe flange with four bolt holes.

FIG. 9 is a front elevational view of the blinding device mounted on a pipe having a pipe flange with eight bolt holes.

DESCRIPTION OF THE INVENTION

Figure 5:
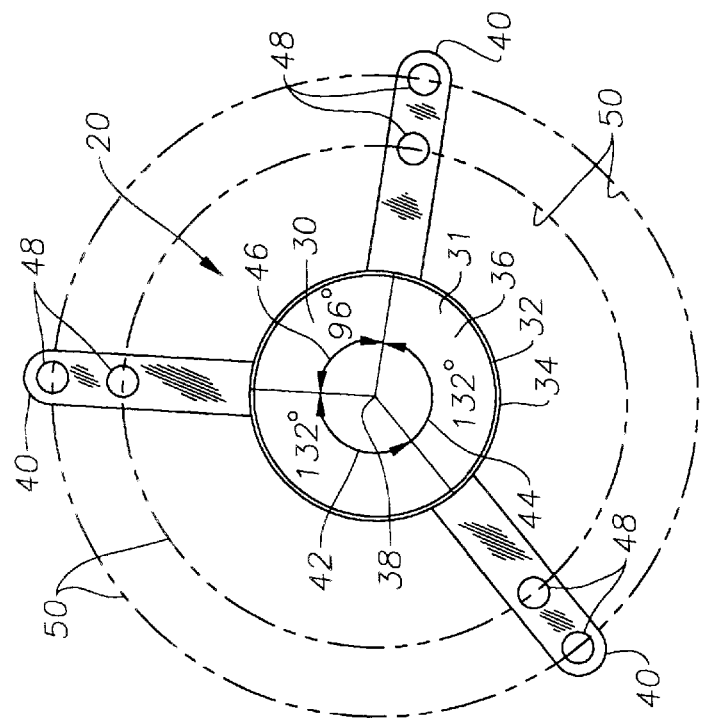
FIG. 5 is a front elevational view of the body, including the plate and the extensions.

The Safety Blinding Device is shown generally in FIGS. 1–9 as 10. Device 10 is utilized to seal a pipe 11 from the remainder of a process system 12. Pipe 11 includes a pipe flow passage 13 and a pipe flange 14. Device 10 releasably mates with pipe flange 14 while covering pipe flow passage 13.

Device 10 generally includes a body 20 and a plurality of bolt clamps 100. The bolt clamps 100 releasably attach body 20 to pipe flange 14. Body 20 covers pipe flow passage 13.

In the preferred embodiment and as bet seen in FIGS. 5, 8, and 9, body 20 comprises a plate 30 and a plurality of extensions 40. In one preferred embodiment, extensions 40 are fixedly attached to body 20 by means well-known in the art, such as welding. In another preferred embodiment, extensions 40 and plate 30 comprise one integral piece that has been stamped out, as is commonly known in the art. Plate 30 and extensions 40 are both preferably manufactured from a rigid and strong metal material.

Plate 30 is preferably circular in shape with a diameter larger than the diameter of pipe flow passage 13 so that plate 30 may completely cover the raised face 9 of pipe 11 thus also completely covering pipe flow passage 13. In the preferred embodiment, one side 31 of plate 30 includes a lip 32 completely around the perimeter 34 of plate 30. A full-faced gasket 36 is disposed within lip 32. Gasket 36 is constructed and disposed within lip 32 so as to provide a positive seal against the raised face 9 of pipe 11 when plate 30 completely covers pipe flow passage 13.

Preferably, extensions 40 extend radially from plate 30. Also preferably, plurality of extensions 40 comprise three extensions 40, each being elongate in shape. The three extensions 40 define a first angle 42, a second angle 44, and a third angle 46 therebetween. In the preferred embodiment, the three extensions 40 are attached to plate 30 so that the first angle 42 and the second angle 44 each measures approximately 132 degrees and so that the third angle 46 measures approximately 96 degrees.

Each extension 40 includes at least one hole 48 therethrough. Preferably, each extension 40 includes holes 48 at different radial distances from the center 38 of plate 30, with the holes 48 at the same radial distance defining a row of holes 50. Preferably, extensions 40 include a plurality of rows of holes 50. Also preferably, each hole 48 includes threading 49 thereon.

Each extension 40 extends radially from plate 30 so that at least one of the holes 48 thereon is not blocked by pipe flange 14 when body 20 is in its operative position, as will be defined herein. In the preferred embodiment including rows of holes 50, each extension 40 extends radially from plate 30 so that at least one of the plurality of rows of holes 50 is not blocked by pipe flange 14 when body 20 is its operative position.

As best seen in FIGS. 1–4, each bolt clamp 100 is releasably mateable to body 20 and pipe flange 14. Thus, when bolt clamps 100 are mated to both body 20 and pipe flange 14, bolt clamps 100 secure device 10 to pipe 11 while body 20 concurrently covers pipe flow passage 13.

In the preferred embodiment, each bolt clamp 100 is releasably mateable to extensions 40. Also in the preferred embodiment, one bolt clamp 100 corresponds to each extension 40. Thus, in the embodiment including three extensions 40, device 10 includes three bolt clamps 100, one for each of the three extensions 40.

Each bolt clamp 100 comprises a clamp body 120, an extension attachment member 140, and a sliding clamp mechanism 160. Extension attachment member 140 is fixedly attached to clamp body 120 and is releasably mateable with the corresponding extension 40 of the respective bolt clamp 100. Sliding clamp mechanism 160 is housed within clamp body 120 and partially protrudes from clamp body 120 so that the protruding section of sliding clamp mechanism 160 is releasably mateable with pipe flange 14.

In the preferred embodiment, clamp body 120 comprises a hollow tubular member 122. Clamp body 120 includes an open first end 124 and a second end 126.

Extension attachment member 140 is fixedly attached to clamp body second end 126. Preferably, extension attachment member 140 comprises a threaded bolt 142. In the preferred embodiment, threaded bolt 142 is threadably mateable with the threading 49 of the holes 48 of extensions 40.

Sliding clamp mechanism 160 is disposed within clamp body 120 intermediate clamp body second end 126 and clamp body open first end 124. Sliding clamp mechanism 160 preferably comprises a stationary rotating screw 162 and a sliding clamp 164. Sliding clamp 164 is threadably engaged to screw 162 so that rotation of screw 162 induces linear movement in sliding clamp 164.

In order to enable the rotation of screw 162 therein, clamp body 120 preferably includes a bearing surface 166 on which screw 162 journals. In the embodiment shown in FIG. 1, bearing surface 166 is proximate clamp body second end 126. As also shown in FIG. 1, screw 162 may include an enlarged section 168, which together with bearing surface 166 and the threading of screw 162, serves to secure screw 162 within clamp body 120 in the axial direction.

Figure 4:
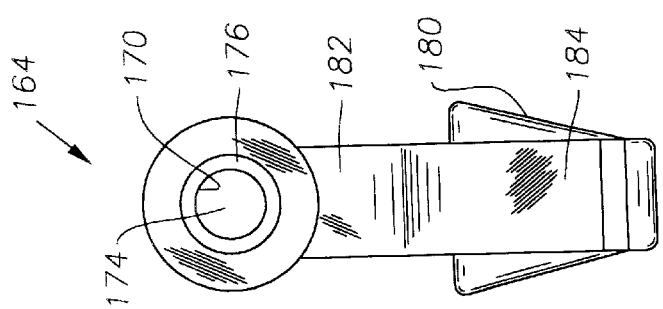
FIG. 4 is a rear elevational view of the sliding clamp.
Figure 3:
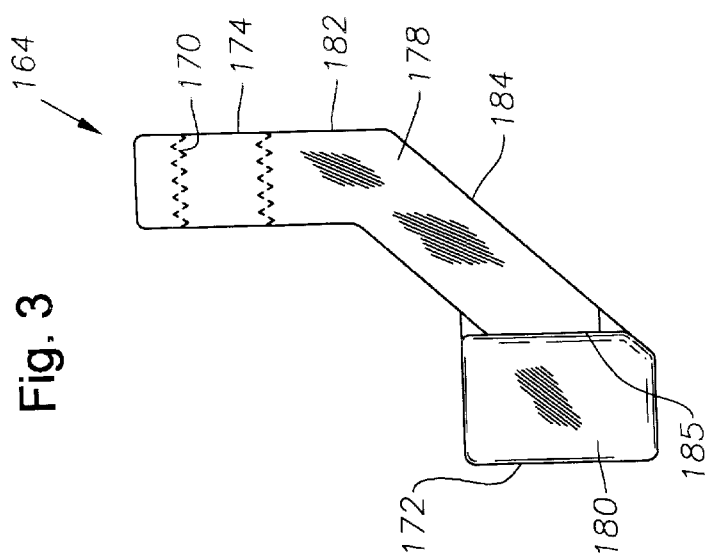
FIG. 3 is a side elevational view of the sliding clamp.

Turning to FIGS. 3 and 4, sliding clamp 164 includes a screw mating surface 170 and a gripping surface 172. Screw mating surface 170 preferably comprises a sliding clamp hole 174 with threading 176 thereon. Sliding clamp hole 174 and threading 176 are sized and constructed to receive screw 162 therein so that hole 174 threadably receives screw 162. Gripping surface 172 is constructed so that it can abut and grip pipe flange 14. Preferably, gripping surface 172 is parallel to pipe flange 14. Also preferably, gripping surface 172 is parallel to a cross-sectional plane of screw 162.

Sliding clamp 164, in the preferred embodiment, includes a mating element 178 and a gripping element 180. Mating element 178 includes sliding clamp hole 174 therein. Mating element 178 includes a first portion 182, extending radially from screw 162, and a second portion 184, extending in the direction of clamp body second end 126 at an obtuse angle from first portion 182. Gripping element 180 is attached to the end 185 of second portion 184 and includes gripping surface 172 therein.

In order to allow the partial protrusion of sliding clamp 162 out of clamp body 120, clamp body 120 also includes a slot 128. Slot 128 is straight extending partially between clamp body open first end 124 and clamp body second end 126. Moreover, slot 128 is wide enough to allow mating element 178 to extend therethrough and move therein. Preferably, slot 128 extends longitudinally on clamp body 120.

Screw 162 preferably includes a means for turning 200 which can be easily engaged by an operator. In the preferred embodiment, means for turning 200 is accessible through the open first end 124 of clamp body 120.

In the preferred embodiment, means for turning 200 comprises a key slot 202 on screw 162 and a key 204. Key slot 202 is preferably located on the end 163 of screw 162 proximate clamp body open first end 124. Key 204, which mates with key slot 202, is sized and constructed to be insertable through open first end 124 and into key slot 202. In addition, key 204, key slot 202, and open first end 124 are sized and constructed so that key 204 may be turned in both the clockwise and counter-clockwise directions while it is inserted through open first end 124 and in key slot 202.

In the preferred embodiment, device 10 further comprises a means for locking 250 the bolt clamps 100 together, as shown in FIG. 6. Means for locking 250 preferably comprises a locking hole 252 on each bolt clamp 100, a cable 254, and a lock 256. Cable 254 is inserted through the locking hole 252 of each bolt clamp 100, and cable 254 is locked with lock 256. Once cable 254 is locked with lock 256, the bolt clamps 100 are secured together.

Preferably, each bolt clamp 100 includes its locking hole 252 proximate clamp body open first end 124. Locking hole 252 comprises a transverse hole through clamp body 120 that is sized and constructed to receive cable 254 therethrough.

Turning back to FIG. 1, each bolt clamp 100 also preferably includes a cap 210 that covers clamp body open first end 124. In the preferred embodiment, cap 210 is removably attached, such as by threading, to clamp body 120. Cap 210 includes a cap locking hole 211 that extends transversely therethrough and that is alignable with locking hole 252. Cable 254 is insertable through cap locking hole 211. Further, cap 210 includes an end opening 212 through which key 204 may be inserted and turned, as will be disclosed herein.

In the preferred embodiment, device 10 further comprises a means for centering 270 body 20 in relation to pipe flow passage 13 to ensure that body 20 adequately covers pipe flow passage 13. Preferably, means for centering 270 comprises a threaded centering hole 272 on each of said bolt clamps 100 and a threaded centering bolt 274 corresponding to each centering hole 272. Each centering bolt 274 is threadably engageable in its corresponding centering hole 272.

Preferably, centering hole 272 is located on clamp body 120 intermediate clamp body second end 126 and screw 162. Also preferably, centering hole 272 is a transverse hole through clamp body 120. In the preferred embodiment, clamp body 120, centering hole 272, and centering bolt 274 are sized and constructed so that centering hole 272 is directly over the outer surface 15 of pipe flange 14 when device 10 is in use and so that the free end 275 of centering bolt 274 is directly over pipe flange outer surface 15.

In one embodiment, device 10 also includes at least one spacing nut 280 for each bolt clamp 100. Each spacing nut 280 is engageable to extension attachment member 140, which preferably comprises threaded bolt 142. Spacing nuts 280 are positioned on extension attachment member 140 intermediate clamp body second end 126 and extension 40. The addition or removal of spacing nuts 280 modify the overall effective length of bolt clamp 100, enabling the use of bolt clamp 100 with a wider size range of bodies, pipes, and flanges.

IN OPERATION

In operation, if pipe 11 needs to be taken off-line for maintenance purposes, pipe 11 must be cut-off from the remainder of the process 12. Thus, a device 10 must be placed on pipe 11 to ensure that no process flow flows from the remainder of the process 12 and into pipe 11.

Device 10 is first positioned next to pipe flange 14 so that at least plate 30 covers the pipe flow passage 13. Next, the extension attachment member 140 of each bolt clamp 100 is securely attached to its corresponding extension 40. In the embodiment including threaded bolt 142 and at least one hole 48, the threaded bolt 142 is threadably engaged to one of the holes 48 of its corresponding extension 40. Spacing nuts 280 may need to be added onto threaded bolt 142 in order to achieve the correct effective length of bolt clamp 100. Clamp body 120 should extend over and past the pipe flange 14. In order for clamp body 120 to extend over and past the pipe flange 14, it may be necessary to secure the threaded bolt 142 to another hole 48, in a different row 50, of its corresponding extension 40. Once the correct hole 48 and row 50 have been selected for one set of extension 40 and bolt clamp 100, each other bolt clamp 100 is likewise secured to a hole 48 on the same row 50 of its corresponding extension 40.

Once each bolt clamp 100 has been secured, the means for centering 270 is activated (in the relevant embodiment). Means for centering 270 ensures that body 20 and plate 30 are adequately centered in relation to pipe flow passage 13 so that plate 30 covers pipe flow passage 13. In the preferred embodiment including threaded centering hole 270 and threaded centering bolt 274, the free end 275 of each centering bolt 274 is preferably directly over pipe flange outer surface 15. Each centering bolt 274 should be tightened until its free end 275 abuts pipe flange outer surface 15. At this point, the centering bolts 274 should be tightened or loosened to provide the proper adjustment to plate 30 in order to ensure proper centering of body 20 in relation to pipe flow passage 13.

Once the body 20 has been properly centered, the bolt clamps 100 must be secured in place. To secure each bolt clamp 100 in place, the means for turning 200 of each screw 162 should be engaged. In the preferred embodiment including key slot 202 and key 204, the means for turning 200 is engaged by inserting key 204 through clamp body open first end 124 (and through cap end opening 212 in the relevant embodiment) and into key slot 202. The rotation of key 204 while inserted in key slot 202 induces the rotation of screw 162. In turn, the rotation of screw 162 controls the sliding movement of the sliding clamp 164. Because the sliding clamp 164 is threadably disposed on screw 162 and because its motion on clamp body 120 is restricted by straight slot 128, the rotation of screw 162 induces the rectilinear motion of sliding clamp 164 along screw 162 within slot 128. Rotation of the screw 162 in one direction induces motion of the sliding clamp 164 towards the extension attachment member 140. Rotation of the screw 162 in the other direction induces motion of the sliding clamp 164 in the opposite direction. By inducing and controlling such rotation, the operator should ensure that the sliding clamp 164 is securely positioned against the pipe flange inside surface 16 thereby holding device 10 in place. Device 10 is in its operative position once each bolt clamp 100 is secured in place. Each bolt clamp 100 should be sufficiently tightened to pipe flange inside surface 16.

Next, the means for locking 250 is activated. In the preferred embodiment including locking holes 252, cable 254, and lock 256, cable 254 is placed through the locking hole 252 of each bolt clamp 100 (and through cap locking hole 211 in the relevant embodiment). Lock 256 is then used to connect the two free ends of cable 254 together. Because the insertion of cable 254 through each locking hole 252 effectively prevents anyone from concurrently inserting key 204 through clamp body open first end 124, cable 254 thus prohibits the activation of the means for turning 200. By prohibiting the activation of the means for turning 200, cable 254 locks bolt clamp 100 in place.

By the disclosed steps, device 10 may be attached only to pipe 11, only to second pipe 18, or to both pipe 11 and second pipe 18. If attachment to only second pipe 18 is desired, then the orientation of device 10 should be changed so that bolt clamps 100 are releasably mateable with second pipe flange 19. If attachment to both pipe 11 and second pipe 18 is desired, then the orientation of only some of the bolt clamps 100 should be changed so that such bolt clamps 100 are releasably mateable with second pipe flange 19 while the remaining bolt clamps 100 remain attached to pipe flange 14.

In the preferred embodiment including first, second, and third angles, 42, 44, and 46, the measurements of first, second, and third angles, 42, 44, and 46, have been selected by the Applicant in order to allow extensions 40 to fall between the bolt holes 17 of any standard pipe flange 14 having any multiple of four bolt holes 17 (ie., 4, 8, 12, 16) (see FIGS. 8 and 9). The great majority of pipe flanges 14 include a multiple of four bolt holes 17. Thus, device 10 functions with all such flanges 14 regardless of the outside diameter or pressure rating of the flanges 14. All that is required for device 10 to properly function with such flanges 14 is for plate 30 to adequate cover pipe flow passage 13 and for extensions 40 to sufficiently extend past pipe flange 14 so as to allow the attachment of bolt clamps 100.

As previously disclosed, spacing nuts 280 may also be fastened to and removed from extension attachment member 140. The removal of spacing nuts 280 allows the insertion of additional bodies 20 so as to increase the overall thickness of plate 30 (and device 10). Increasing the thickness of device 10 is sometimes desirable, particularly for purposes of hydrostatic testing the pipe 11.

Further, in such instances when additional strength is required, the configuration of the first, second, and third angles, 42, 44, and 46, allows for threaded bolts to be inserted through the flange bolt holes 17 of both pipe flange 14 and second pipe flange 19 thereby providing the necessary additional strength. As was previously disclosed, the use of threaded bolts to join pipe flanges with a blinding device therebetween is known to the prior art. Thus, device 10 not only provides an inventive new locking mechanism, but also enables the utilization of the old locking technology for additional strength, if necessary.

When pipe 11 is taken off-line and device 10 is attached to pipe flange 19, device 10 will remain attached to pipe 11 (due to means for locking 250) thereby eliminating the possibility of device 10 being prematurely removed, as is the case in prior art blinding devices. Pipe 11 will return on-line to the process 12 with device 10 still attached thereto.

Further, device 10 can enable both sealing blinding and spacer blinding. Sealing blinding is achieved with use of gasket 36 as previously disclosed. It is important to note, however, that for sealing blinding operations users must also use the old locking technology (threaded bolts) to secure the device 10 to the flanges, 14 or 19. Under normal circumstances, the bolt clamps 100 by themselves do not provide a sufficiently strong enough securement between device 10 and flanges, 14 or 19, to enable a safe sealing blinding condition. Spacer blinding is achieved by placing a spacer with openings therein intermediate plate 30 and pipe flange 14. Spacer blinding may require the removal of a spacing nut 280 so as to accommodate the spacer therein.

Once pipe 11 is ready to be brought back on-line, the means for locking 250 is first unlocked. Next, each bolt clamp 100 is de-secured from pipe flange 14 by reversing the direction of the means for turning 200 screw 162. The means for centering 270 is then loosened by loosening centering bolts 274. Finally, device 10 is removed from pipe 11, possibly also requiring the removal of extension attachment members 140 from extensions 40.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A safety blinding device, comprising:

a cover;

a plurality of extensions extending radially from said cover;

each of said plurality of extensions including at least one hole extending therethrough;

a bolt clamp corresponding to each of said plurality of extensions;

each of said bolt clamps releasably mateable with said at least one hole of said corresponding extension;

said plurality of extensions comprising three extensions;

said three extensions defining a first, a second, and a third angle therebetween;

said first and second angles measuring approximately 132 degrees; and said third angle measuring approximately 96 degrees.

2. A device as in claim 1, wherein each of said bolt clamps comprising:

a clamp body;

an extension attachment member fixedly connected to said clamp body;

said extension attachment member releasably mateable with said at least one hole of said corresponding extension;

a sliding clamp mechanism housed within said clamp body and partially protruding from said clamp body;

said sliding clamp mechanism comprising a stationary rotating screw housed within said clamp body and a sliding clamp threadably disposed on said screw and protruding from said clamp body;

said clamp body including an opening;

said screw including a means for turning; and said means for turning accessible through said body opening.

3. A device as in claim 2, wherein said means for turning comprising:
- a key slot on said screw;
- said key slot accessible through said body opening;
- a key which fits said key slot; and
- said key insertable through said body opening.

4. A device as in claim 2, further comprising a means for locking said bolt clamps together, wherein said means for locking comprising:
- each of said bolt clamps including a locking hole therethrough;
- a cable passing through each of said locking holes;
- said cable while inserted in said locking holes prohibiting the activation of said means for turning; and
- a lock for locking said cable.

5. A safety blinding device used to seal a pipe from the remainder of a process system, said pipe including a flow passage and a flange, said device comprising:
- a body for covering said pipe flow passage;
- a plurality of bolt clamps releasably mateable with said body;
- said plurality of bolt clamps releasably mateable with said pipe flange;
- said body comprising a cover for covering said pipe flow passage;
- said body further comprising a plurality of extensions extending from said cover;
- one of said plurality of bolt clamps corresponding to each of said plurality of extensions;
- each of said bolt clamps releasably mateable with said corresponding extension;
- said cover having a circular shape and a perimeter;
- said cover including a lip around said perimeter;
- said cover including a gasket disposed within said lip; and
- wherein said gasket seals with said pipe flange.

6. A device as in claim 5, wherein:
- each of said bolt clamps including a sliding clamp;
- each of said sliding clamps releasably mateable with said pipe flange;
- each of said bolt clamps further comprising a clamp body and a stationary rotating screw housed within said clamp body;
- said sliding clamp threadably disposed on said screw and protruding from said clamp body;
- said clamp body including an opening;
- said screw including a means for turning; and
- said means for turning accessible through said body opening.

7. A device as in claim 6, wherein said means for turning comprising:
- a key slot on said screw;
- said key slot accessible through said body opening;
- a key which fits said key slot; and
- said key insertable through said body opening.

8. A device as in claim 5, further comprising a means for locking said bolt clamps together, wherein said means for locking comprising:
- each of said bolt clamps including a locking hole therethrough;
- a cable passing through each of said locking holes;
- said cable while inserted through said locking holes prohibiting the removal of said bolt clamps from said pipe flange; and
- a lock for locking said cable.

9. A device as in claim 5, further comprising a means for centering said body in relation to said pipe flow passage, wherein said means for centering comprising:
- each of said bolt clamps including a threaded centering hole therethrough;
- a threaded centering bolt corresponding to each of said centering holes;
- each of said centering bolts threadably engageable in said corresponding centering hole so that each of said centering bolts abuts said pipe flange;
- wherein the relative location of said body and said pipe flow passage may be adjusted by rotating said centering bolts.

* * * * *